United States Patent [19]

Ogawa et al.

[11] 4,090,110
[45] May 16, 1978

[54] CONVERGENCE MEANS FOR COLOR CATHODE RAY TUBE

[75] Inventors: Seiichi Ogawa, Tokyo; Hiroyuki Sumiya, Fussa, both of Japan

[73] Assignee: Sony Corporation, Tokyo, Japan

[21] Appl. No.: 717,476

[22] Filed: Aug. 25, 1976

[30] Foreign Application Priority Data

Aug. 25, 1975 Japan .................................. 50-102810

[51] Int. Cl.² ......................... H01J 29/70; H01J 29/76
[52] U.S. Cl. ..................................... 315/368; 315/13 C
[58] Field of Search ................ 315/13 C, 13 CG, 368; 313/411, 412

[56] References Cited

U.S. PATENT DOCUMENTS 3,840,771  10/1974  Morio et al. ........................ 315/13 C
3,902,100  8/1975   Nakagawa et al. ................... 315/368

FOREIGN PATENT DOCUMENTS 21,930     10/1968  Japan ................................. 315/13 C
1,442,723  7/1976   United Kingdom ................. 315/368

*Primary Examiner*—Maynard R. Wilbur
*Assistant Examiner*—T. M. Blum
*Attorney, Agent, or Firm*—Lewis H. Eslinger; Alvin Sinderbrand

[57] ABSTRACT

The beam forming means and static convergence correcting means in a color cathode ray tube are arranged to provide for proper convergence of the beams at regions remote from the center of the screen and closer to the corners. The resulting misconvergence at the center of the screen is then corrected by dynamic convergence correcting means which produces less beam distortion then if it had to correct misconvergence at the corners.

10 Claims, 13 Drawing Figures

CONVERGENCE MEANS FOR COLOR CATHODE RAY TUBE

BACKGROUND OF THE INVENTION

1. Field of the Invention

This invention relates to convergence correction apparatus for color cathode ray tubes and particularly to apparatus that includes static and dynamic convergence correcting devices, at least the latter of which is a magnetic correcting device.

2. Description of the Prior Art

It has been the practice heretofore to provide proper focusing and convergence of the electron beams of a color cathode ray tube at the center of the screen when the magnetic deflection fields are not present and therefore are not contributing to any distortion of the beam or to any misconvergence. However, as the beams are deflected away from the center of the screen and particularly at the most distant locations in the four corners of the screen, the beams are subjected to magnetic fields and in some cases to electrostatic fields that cause the beams to strike different locations instead of being converged to a small area and further cause the cross sections of the beams to be distorted. Both of these effects cause the quality of the image to be deteriorated at the corners of the picture.

In addition, the change of beam size due to distortion affects the current density. Steps taken to correct the misconvergence at the corners still may leave the current density uncorrected. Since the luminance of the different phosphors is relatively linear only up to a certain maximum amount and is then saturated, and the point of saturation is different for the different phosphors, the hue of the image will be incorrect at the corners due to the fact that one of the phosphors will start to saturate first.

OBJECTS AND SUMMARY OF THE INVENTION

It is one of the objects of this invention to provide a simpler and better convergence arrangement for a color cathode ray tube.

Another object is to provide more uniform color balance over the entire cathode ray tube screen.

A further object is to provide improved convergence of the beams of a multibeam color cathode ray tube without producing high distortion of the beams.

Further objects will become apparent from the following description including the drawings.

In accordance with this invention a multibeam color cathode ray tube, particularly a tube of the general type shown and described in U.S. Pat. No. Re 27,751, has a static convergence correction device, such as a set of electrostatic deflection plates with applied voltages of the magnitude to cause static convergence of the beams at the corners of the cathode ray tube. The result is misconvergence at the center. However, the misconvergence at the center is corrected by a dynamic correction device that causes the beams to converge at a time when the beams are not also being subjected to the magnetic deflection fields.

DETAILED DESCRIPTION OF THE EMBODIMENTS

Figure 1:
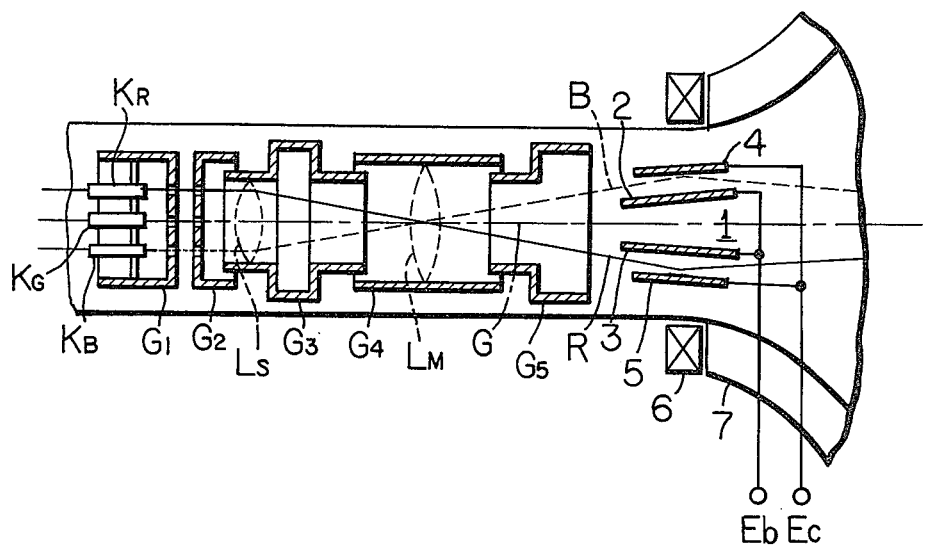
FIG. 1 is a simplified cross sectional view of the electron gun region and part of the convergence and deflection coils of a color cathode ray tube.

The cathode ray tube in FIG. 1 includes means for forming three electron beams. In the embodiment illustrated the tube is provided with three cathodes $K_R$, $K_G$ and $K_B$ as the origin of the three beams. The cathodes are supported by insulating means within a control grid $G_1$ that has appropriately spaced apertures for the three beams. In front of, and spaced slightly from, the first grid is a second grid $G_2$ that also has appropriately spaced apertures. Beyond the second grid $G_2$, that is, to the right of that grid as shown in FIG. 1, is the beam focusing structure that includes a three-element electron lens consisting of three generally cylindrical electrodes identified as $G_3$, $G_4$ and $G_5$. Commonly electrodes $G_3$ and $G_5$ are directly electrically connected together and are operated at or close to the most positive voltage of the tube.

Beyond the electrode $G_5$ is an electrostatic convergence structure 1 comprising an inner pair of deflection plates 2 and 3 juxtaposed, respectively, with a pair of outer deflection plates 4 and 5. The plates 2 and 3 are electrically connected together to a voltage terminal $E_b$ and the plates 4 and 5 are electrically connected together to a terminal $E_c$.

External to the tube in FIG. 1 are an electromagnetic convergence device 6 and part of a deflection yoke 7. The latter is arranged to deflect the electron beams, for the most part, after they have been subjected to convergence forces by the structure 1 and the structure 6.

The cathodes $K_R$, $K_G$ and $K_B$ are preferably located in the same plane, which may be considered to be the plane of the drawing. The cathode $K_G$ is at the center at the axis of the tube and the other two cathodes are parallel to the cathode $K_G$ and equally spaced from it on opposite sides. The beams originally emitted from the cathodes are substantially parallel until they reach a lens identified as $L_S$, formed generally by electrostatic fields in the region between the second grid $G_2$ and the anode, or third grid, $G_3$. This lens is commonly called an auxiliary lens. The focal length of the auxiliary lens is such that it causes the three beams to intersect in the lens region $L_M$ approximately centrally located in the three-element lens formed by the electrodes $G_3$–$G_5$. As is now well known, this permits the three beams identified as R, G and B to be focused by nearly the same electrostatic field in the three-electrode lens so as to minimize distortion of the spots produced by the electron beams at the screen (not shown). After passing through the lens field $L_M$ and being focused thereby (an action which is not illustrated), the beams diverge along continuations of the lines by which they entered the lens field $L_M$. The beam that will eventually strike green phosphor elements and is therefore identified by the reference character G, continues along the tube axis midway between the deflection plates 2 and 3. Since these plates are at the same voltage, the beam G is not substantially affected by the voltage on those plates. The beam B passes between the plates 2 and 4 and the beam R passes between the plates 3 and 5. Since these beams originate at points that are symmetrically displaced with respect to the beam G, and since the deflection plates of the structure 1 are also substantially symmetrically arranged, voltages applied to the terminals $E_b$ and $E_c$ deflect the beams B and R to intersect the beam G once more at the region of the screen of the cathode ray tube. In accordance with prior technology, if the screen has a 22 inch size, the voltage $E_b$, which is considered the anode voltage of the tube, is approximately 1300 volts higher than the voltage $E_c$. This voltage brings the three beams together at the center of the cathode ray screen and is referred to as the static convergence correction condition. It is illustrated in either FIG. 3 or FIG. 4 by the single dot at the center of the screen S of those two figures.

Figure 2:
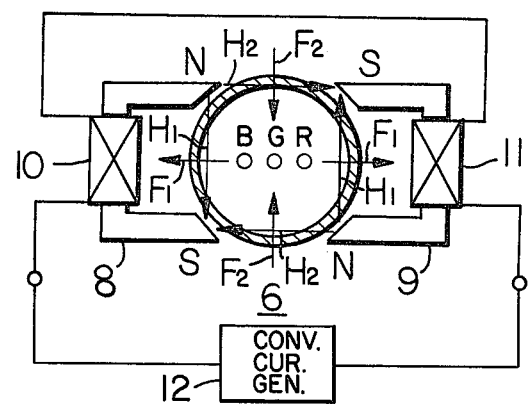
FIG. 2 illustrates the relationship between the dynamic convergence apparatus and the electron beams in the device in FIG. 1 when operated according to the prior art.

The dynamic convergence correction device 6 is located at substantially the same point on the Z-axis of the cathode ray tube as the static convergence correction device 1. As shown in FIG. 2, the dynamic convergence correction device 6 comprises two U-shaped magnetic cores 8 and 9. A coil 10 is wound on the core 8 and a similar core 11 is wound on the core 9. The coils are connected in series and are polarized so that the current of a given polarity following through them will produce magnetic fields in the cores 8 and 9 to result in north and south magnetic poles N and S as illustrated in FIG. 2. The direction of flux across the poles of the core 8 and across the poles of the core 9 is indicated by the reference character $H_1$. Flux between the upper ends of the cores 8 and 9 and between the lower ends of these cores is denoted by reference character $H_2$. The arrangement of the cores 8 and 9 is called a four-pole construction. The forces produced by magnetic fields of the cores 8 and 9 acting on electron beams B, G and R are indicated as the forces $F_1$ and $F_2$. The force $F_1$ is produced by the flux $H_1$ and the force $F_2$ is produced by the flux $H_2$. In the simplified representation in FIG. 2, these forces are illustrated as being substantially perpendicular to the respective magnetic fields that cause them, and the combined effect of these forces is to flatten the beams vertically and to spread them apart horizontally.

Figure 3:
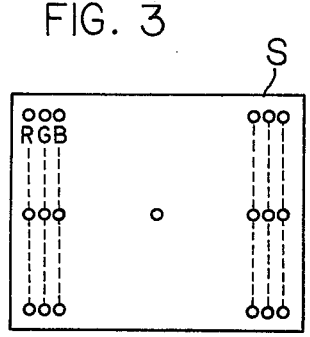
FIGS. 3 and 4 illustrate two types of misconvergence of electron beams on a cathode ray tube screen in a tube of the type represented in FIG. 1.

The beam pattern produced on the screen S of a cathode ray tube in accordance with the prior art is indicated in FIG. 3. At the center of the screen S, the three beams are caused to converge to a single dot by electrostatic fields on the deflection plates 2–5. These plates are not illustrated in FIG. 2, but would be located in a manner consistent with the cross sectional view illustrated in FIG. 1 so that the electrostatic fields acting upon the beams B and R would both be horizontally inward in FIG. 2 to cause them to intersect at the center of the screen S in FIG. 3. The type of misconvergence illustrated in FIG. 3 varies only horizontally and not vertically and, in accordance with the teachings of the prior art, has heretofore been corrected by applying a parabolic current of the type shown in FIG. 5 to the coils 10 and 11 in the dynamic convergence correction structure 6 in FIG. 2. This parabolic current has a periodicity of 1H corresponding to the horizontal deflection frequency.

Figure 4:
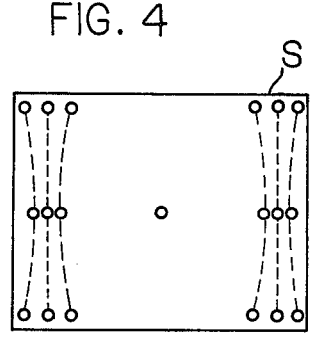
Figure 6:
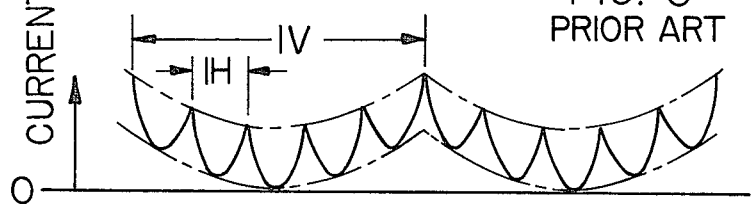
FIG. 6 is a waveform of a modified correction current to correct for the misconvergence shown in FIG. 4.

FIG. 4 shows another typical misconvergence pattern, and FIG. 6 shows the prior art convergence correction current applied to the coils 10 and 11 in FIG. 2. The misconvergence illustrated in FIG. 4 has both a horizontal and a vertical component and therefore the correction current waveform in FIG. 6 includes a parabolic horizontal component 1H and a parabolic vertical component 1V. The combined currents reach a maximum when the beams are deflected to the four corners of the screen S.

Figure 7:
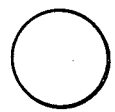
FIG. 7 illustrates the proper cross sectional shape of an electron beam in a tube of the type shown in FIG. 1.
Figure 8:
FIG. 8 shows a typical distortion of the cross sectional shape of the beam in FIG. 7.

FIG. 7 represents the cross section of any one of the beams R, B or G when the current flowing through the dynamic convergence correction structure 6 in FIG. 2 is zero under the conditions of the prior art. That is, the correction current applied to the coils 10 and 11 in the structure 6 is zero and the beams are not deflected from the center of the screen S. However, when the beams are deflected toward the corners under the conditions of the prior art, which requires that the current through the coils 10 and 11 be at the peak values shown in FIG. 5 to correct the type of misconvergence in FIG. 3 or at the peak values shown in FIG. 6 to correct the type of misconvergence in FIG. 4, the beams are flattened as illustrated in FIG. 8. This is due to the force $F_1$ pulling the electron beams horizontally so as to spread them apart and the force $F_2$ compressing the beams vertically. This distortion of the beams adversely affects the quality of the television picture, mainly by adversely affecting the focus of the beams at the outer part of the screen.

Figure 9:
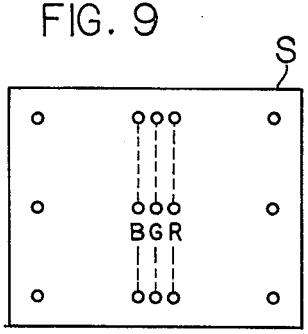
FIG. 9 shows a beam pattern similar to that in FIG. 3 but with static correction applied according to the present invention.

The present invention overcomes the disadvantage of the prior art by changing the convergence correction fields. In accordance with the present invention, an anode voltage $E_b$ supplied to the inner deflection plates 2 and 3 of the static convergence device 1 and the convergence voltage $E_c$ applied to the outer deflection plates 4 and 5 are more nearly at the same level than in the prior art. For example, the difference between the voltage $E_b$ and the voltage $E_c$ may be lower, thus creating a different convergent lens than the prior art. This can be accomplished by making the voltage $E_c$ only about 1100 volts lower than the anode voltage $E_b$ for a 22 inch color cathode ray tube instead of 1300 volts in accordance with the prior art. This causes the beams to be properly converged at the outer sides of the screen S in the case of a cathode ray tube having a misconvergence only in the horizontal direction as shown in FIG. 9. The dynamic correction current applied to the coils 10 and 11 from a source 12 is of the type shown in FIG.

Figure 5:
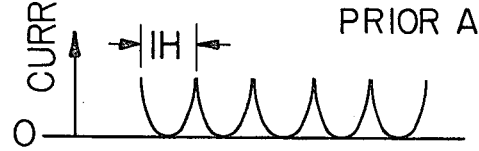
FIG. 5 is a waveform of correction current applied to the dynamic correction device in FIG. 1 according to the prior art.

11, which has the same parabolic waveform shown in FIG. 5 but which reaches zero value when the electron beams are deflected to the edges of the screen. This parabolic current has a negative value that reaches a maximum value when the beams are at the center of each horizontal line, and little or no dynamic convergence force is applied by the magnetic field when the beams are at the ends of each line.

Figure 10:
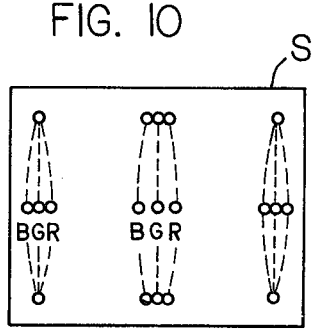
FIG. 10 shows a beam pattern corresponding to that in FIG. 4 but with proper static convergence according to the present invention.

In the case of a tube having both horizontal and vertical components of misconvergence, the reduction in the voltage difference between the inner deflection plates 2 and 3 and the outer deflection plates 4 and 5 eliminates misconvergence at the corners of the screen S as shown in FIG. 10. The correction current applied to the coils 10 and 11 from a source 12 must be of the type illustrated in FIG. 12. This current has the same waveform as the correction current shown in FIG. 6 but reaches zero value at the corners of the screen and a maximum negative value at the center of the middle line of the raster.

Figure 11:
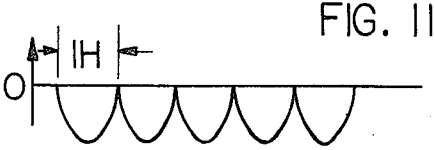
FIG. 11 is a waveform of dynamic convergence correction current to effect convergence of the beams having the type of misconvergence shown in FIG. 9.
Figure 12:
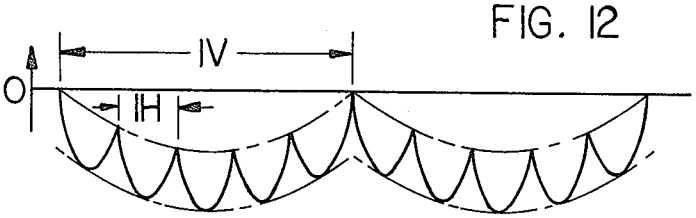
FIG. 12 is a waveform of the current applied to a dynamic convergence correction device according to the present invention to correct misconvergence of the type illustrated in FIG. 10.

The current values required for dynamic convergence correction in accordance with this invention and as illustrated in FIGS. 11 and 12 do not necessarily have the same magnitudes as the current values in FIGS. 5 and 6. When the beams are in the exact center of the screen, they are not subjected to any deflection fields, which, when present, have not only a deflecting effect but a focusing effect that is a function of the deflection current and of the configuration of the deflection yoke 7. As a result dynamic convergence current may be less than in the case of the maximum dynamic convergence current in FIGS. 5 or 6. The magnetic field produced in the structure 6 in FIG. 2 is, in effect, a magnetic lens that has unequal horizontal and vertical effects on the beams. In the case of the present invention, this lens has maximum power due to maximum current when the beams are at the center of the screen and are thus not subjected to the combined lens and prism effects of the deflection yoke 7 shown in FIG. 1. As a result the beams B, G and R are not distorted in the manner shown in FIG. 8 or at least are distorted less than under the conditions of the prior art. This produces a picture of relatively uniform high resolution, not only at the outer part of the screen, but in the central region.

Figure 13:
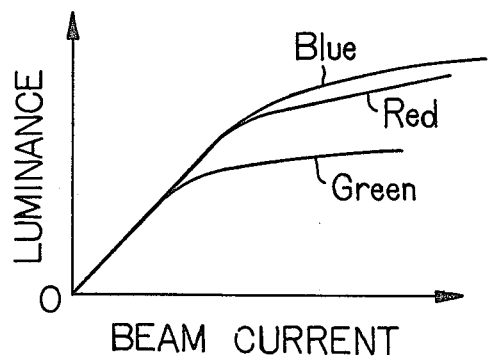
FIG. 13 is a graph of luminance versus beam current for different phosphors.

FIG. 13 shows the relationship between luminance and beam current for three typical phosphors used in color cathode ray tubes. For low beam currents the luminance of all three phosphors varies substantially linearly with the beam current. At a certain beam current the green phosphor begins to saturate so that additional current does not produce a corresponding additional green luminance. In the absence of any correcting circuits, if the beam current extends to a high enough value for all three phosphors so that the green phosphor is saturated, an image of a white object would take on a magenta hue due to an excess of red and blue light with respect to the green.

When the convergence correction device 6 is used in accordance with the prior art, maximum distortion of the beam spots occurs at the outer parts of the screen S. The beam distortion concentrates the beams at the outer parts of the screen and thus produces the effect of excess beam current, even if the current remains constant. The reason is that the constant current is concentrated into a smaller area by the distortion and thus the phosphor elements are subjected to increased current density. This produces the same adverse effect on hue as if the current had simply been increased without beam distortion.

By correcting the beam convergence according to the present invention, there is relatively little distortion of the beams at any part of the screen S and thus there is less tendency to have a high density that will adversely effect the color balance.

What is claimed is:

1. A convergence correction system for a color cathode ray tube comprising a fluorescent screen and means to produce three electron beams, said system comprising a deflection yoke to deflect said beams at line repetition rate in a raster pattern repeated at field repetition rate on said screen, and system further comprising:

static convergence correction means to cause said beams to be substantially fully converged to common points at certain outer regions of said screen and to be only partially converged at the central region of said screen; and magnetic, dynamic, convergence correction means comprising a coil and current-generating means connected thereto to supply to said coil a magnetic convergence correction current that has a repetitive waveform with a maximum magnitude when said beams strike the central region of said screen and a lesser magnitude when said beams are deflected to strike said certain outer regions of said screen to cause said coil to produce a magnetic convergence field of greatest intensity when said beams strike said central region, whereby said beams are substantially fully converged at said central region.

2. The convergence correction system of claim 1 in which said static convergence correction means comprises:

electrostatic deflection means within said tube and positioned therein between said means to produce said beams and the location of said deflection means; and substantially constant voltage means connected to said electrostatic deflection means to apply thereto deflection voltages of magnitudes sufficient to cause said beams to converge to common points at the outer region of said raster pattern and less than sufficient to cause said beams to converge to a common point at the center of said raster pattern.

3. The convergence correction system of claim 1 in which said vurrent-generating means comprises means to generate a correction current in which said repetitive waveform comprises parabolic segments of substantially equal amplitude and the same repetition rate as said line repetition rate.

4. The convergence correction system of claim 3 in which said current-generating means generates a current having second substantially parabolic waveform segments at a repetition rate equal to the field repetition rate of said raster, said first-named correction current and said second current being connected additively to said magnetic dynamic convergence correction means and the additive value of said first-named current and said second current being substantially equal to zero when said beams are deflected substantially to the corners of said raster.

5. A convergence correction system for a color cathode ray tube comprising a fluorescent screen and means to produce three electron beams directed generally toward said screen, said system comprising a magnetic deflection yoke located on said tube in a region between said means to produce said beams and said screen to deflect said beams in a raster pattern on said screen in response to deflection currents applied to said deflection yoke, said deflection yoke producing an electron lens with a strength that is a function of the deflection current and is substantially zero at the center of said raster, said system further comprising:

electrostatic static convergence deflection plates in said tube in a region between said means to produce said beams and said region on which said deflection yoke is located, said deflection plates having a fixed voltage applied thereto to produce a static convergence field to converge said beams in combination with the focusing effect of said yoke when said beams are deflected by said yoke to the outermost parts of said raster;

magnetic dynamic convergence means defining a lens field and comprising a coil; and means to generate a convergence correction current to be applied to said coil to cause said magnetic dynamic convergence means to produce a magnetic electron lens having different horizontal and vertical strengths, the magnitudes of said strengths being a function of the magnitude of said current and varying from substantially zero when said beams are deflected to the outermost parts of said raster to a maximum when said beams are not deflected from the center of said raster, whereby said beams are converged at the center of said raster by the combined effects of said statis convergence field and said lens field of said magnetic dynamic convergence means when said deflection current in said yoke is substantially zero.

6. A convergence correction system for a color cathode ray tube comprising a fluorescent screen and means to produce three electron beams, sais system comprising a deflection yoke to produce a deflection field to deflect all of said beams simultaneously in a rectangular raster pattern comprising a plurality of substantially parallel lines generated on said screen at line repetition rate, said system further comprising:

static convergence means to produce, in cooperation with the deflection field of said yoke, a convergence field to cause said beams to be substantially fully converged to common points only when said beams are deflected to outer regions of said raster pattern;

magnetic dynamic convergence correction means comprising a coil and current generating means connected thereto to supply to said coul a convergence correction current comprising a parabolic waveform repetitive at said line repetition rate, said current having a maximum magnitude when said beams are directed to the central region of said screen and substantially zero magnitude when said beams are deflected to said outer regions of said raster pattern.

7. The method of correcting convergence of electron beams on a color cathode ray tube screen, said method comprising the steps of:

statically converging the beams near outer regions of the screen; and imposing additional dynamic magnetic convergence fields on selective ones of said beams, said dynamic magnetic convergence fields having maximum intensity when the beams are in the central region of the screen to converge the beams in said central region.

8. The method of correcting convergence of a plurality of electron beams disposed in spaced relation substantially in a common plane and deflected along a series of lines defining a rectangular raster, said lines being substantially parallel to said plane and being the points of interception of said beams with a cathode ray tube screen, said method comprising:

statically deflecting said beams selectively parallel to said plane to cause all of said beams to converge at the corners of said raster; and selectively imposing on said beams dynamic magnetic convergence fields having maximum intensity when the beams strike the central region of the raster, said dynamic convergence fields applying converging force to said beams in a direction parallel to said plane and substantially perpendicular to said beams.

9. The method of claim 8 in which said dynamic, magnetic, convergence fields have minimum intensity when beams are deflected to each end of each of said lines.

10. The method of claim 8 in which said dynamic magnetic convergence fields have minimum intensity only when said beams are deflected to the corners of said raster.

* * * * *